Figure 1:
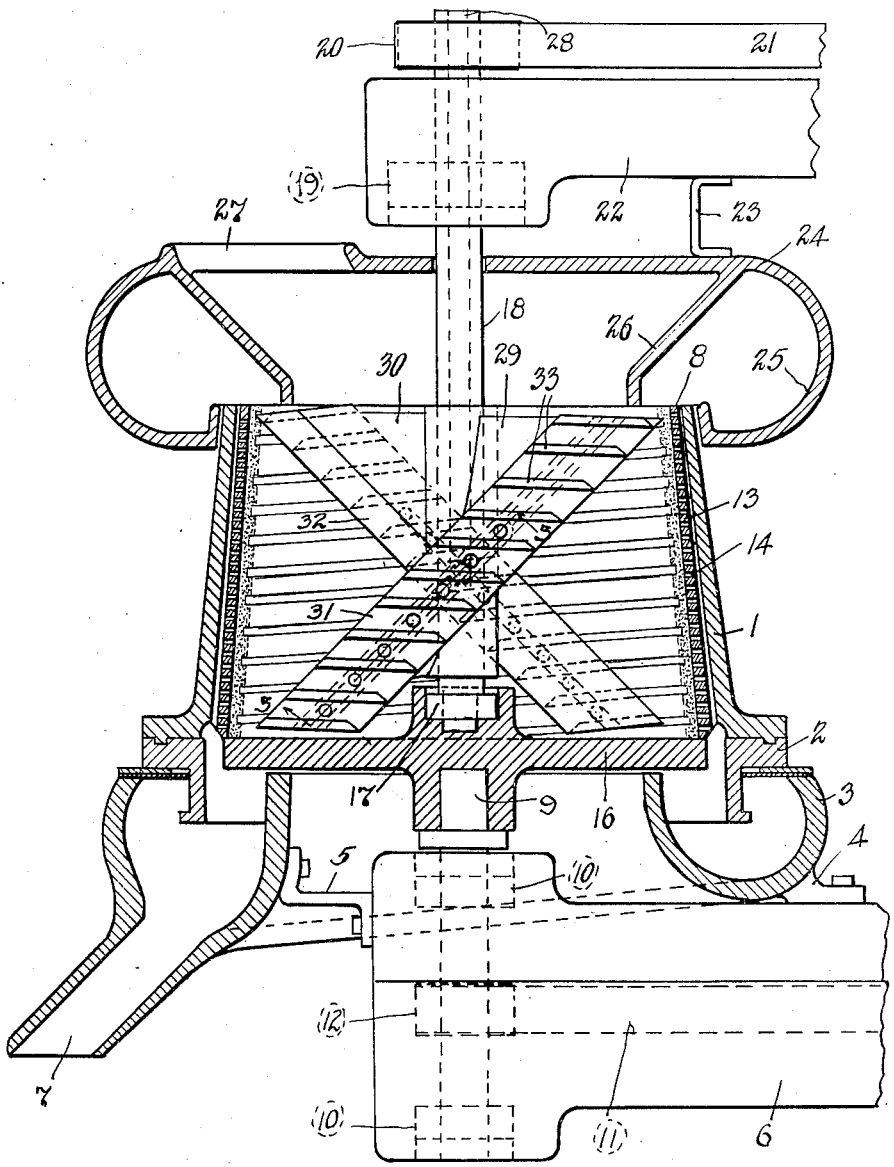

Feb. 5, 1935. W. M. ZORN ET AL 1,989,728
METHOD OF AND APPARATUS FOR TREATING MATERIAL
Filed March 30, 1933 2 Sheets-Sheet 2
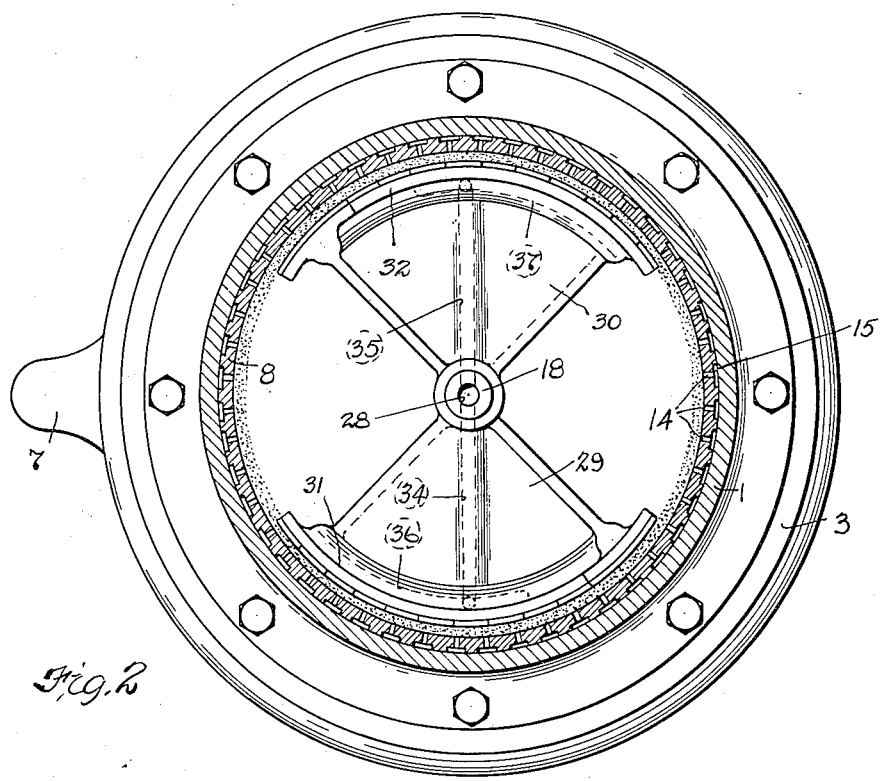
Fig. 2
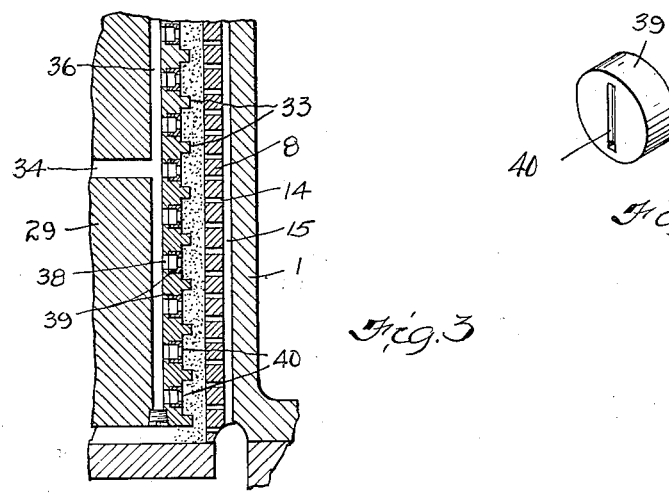
Fig. 3
Fig. 4
INVENTORS
Walter M. Zorn and
BY Walter F. Egger.
Fay, Oberlin & Fay
ATTORNEYS Patented Feb. 5, 1935

1,989,728

UNITED STATES PATENT OFFICE 1,989,728

METHOD OF AND APPARATUS FOR TREATING MATERIAL

Walter M. Zorn, East Cleveland, and Walter F. Egger, Euclid Village, Ohio, assignors to The Low Temperature Processing Company, Cleveland, Ohio, a corporation of Ohio Application March 30, 1933, Serial No. 663,542

7 Claims. (Cl. 210—69)

This invention relates as indicated to methods of and apparatus for treating materials and more specifically, to such method and apparatus employing centrifugal force for the purpose of effecting relative movement between the material being treated and the treating material.

The principles comprising our invention presently to be explained are applicable to a wide variety of treatments, a notable example of which is filtration. One of the chief disadvantages incidental to all filters commercially available at the present time is that they require such a large amount of filtering medium in order to operate successfully that the cost of their operation is usually very high.

It has been suggested in the prior art that a wall of filter material might be built up through which the liquid to be filtered is passed and the material filtered out of the liquid permitted to build up in a layer on such wall to be periodically removed by some scraping means. Any such apparatus, of course, may operate continuously only for a relatively short time until it is necessary to shut down the apparatus and completely renew the wall of filter material.

In order to get around the above defined difficulty incidental to the operation of continuous filters, it has also been suggested in the prior art to pre-form a substantially cylindrical layer or cake of filter material which is bodily moved through the filtering zone so that the entire filter wall is being continuously replaced. Any of the above-named expedients which have been adopted in order to render practicable a continuous filter have been excesssively costly in their mode of operation for the reason that only a minor proportion of all of the filtering material used is saturated by the residue.

When a wall of filter material is built up, only a relatively thin portion of the surface of such wall retains the major proportion of the suspended matter removed from the filtrate. After the wall has become clogged and unfit for use, it will usually be found that a large portion of the wall is still fairly uncontaminated but which must be thrown away with that portion which has become saturated.

It is among the objects of our invention to provide a method of and apparatus for continuous filtration in which all of the filtering medium employed will be saturated with the residue from the filter so that the cost of operation of the apparatus, so far as the filtering medium is concerned, will be reduced to a minimum.

The method and apparatus for treating materials comprising our invention is, as previously indicated, applicable to a wide variety of usages.

It is within the contemplation of our invention to provide a process and apparatus for effecting treatments such as infusion, filtration, absorption, or any other type of treatment which is effected by passing a liquid over or through a solid. The principles of our invention are applicable to the process of treating solid material with the liquid, as well as treating liquids with solids.

It is a further object of our invention to provide a process whereby the filtering operation of certain types of liquids relatively unstable at high temperatures may be filtered or treated by passing the same through a filter bed of ice crystals.

Other objects of our invention will appear as the description proceeds.

To the accomplishment of the foregoing and related ends, said invention, then consists of the means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

In said annexed drawings:—

Figure 1 is a vertical, part sectional, part elevational view of one form of apparatus constructed according to the principles of our invention and adapted to carry forth the process comprising our invention; Figure 2 is a part plan, part transverse sectional view of the apparatus illustrated in Figure 1. In this figure, the outer shell is shown in elevation and the inner rotating members are respectively shown in section and elevation. Figure 3 is a fragmentary sectional view drawn to an enlarged scale of a portion of the apparatus illustrated in Figure 2 taken on a plane substantially indicated by the line 3—3; and Figure 4 is a perspective view of an element included in the apparatus as illustrated in Figure 3.

Referring now more specifically to the drawings and more especially to Figure 1, the apparatus comprising our invention consists of an outer stationary bowl, generally indicated at 1, which is substantially coniform and at its lower end provided with a skirt, generally indicated at 2, which rests on a stationary collecting ring 3. The ring 3 supporting the skirt 2 on the bowl 1 may be supported by suitable brackets such as 4 and 5 on a support, generally indicated at 6. The collecting ring 3 has a gravity discharge spout 7 associated therewith at one side.

Positioned coaxially within the stationary bowl 1 is an inner rotatable bowl 8 mounted on a spindle 9. The spindle 9 is supported in suitable bearings 10 in a support 6 and may be driven by any suitable means such as a belt 11 trained about a pulley 12 secured to the spindle 9. The lateral wall 13 of the bowl 8 is provided with a large number of equally distributed apertures 14 extending therethrough which are preferably arranged in vertical rows disposed between axially extending circumferential ribs 15 formed on the outer periphery of the bowl 8. The bottom 16 of the bowl 8 is centrally provided with a bearing recess for a friction reducing bearing 17, which rotatably supports the lower end of a spindle 18. The spindle 18 is, at its upper end, journaled in a bearing 19 and has a pulley 20 secured thereto about which may be trained suitable driving means such as a belt 21. The belts 11 and 21 may be driven from the same or different sources of power and through speed changing means so that the spindles 9 and 18 may be driven in the same direction but at variably different speeds. The support 22 in which the bearing 19 is mounted, through a bracket 23, supports a combination hood and collecting ring, generally indicated at 24. The hood 24 is belled out as at 25 to serve as a collecting ring for material which is discharged from the upper end of the bowl 8. An annular substantially coniform partition 26 is associated with the hood 24 so that, through the opening 27 in such hood, material to be treated may be introduced to the interior of the bowl 8.

As previously indicated, the apparatus illustrated as one means for carrying out the principles of the processes comprising our invention is adapted for use in treatments where either the solid material may be treated by means of a liquid or the liquid treated by passing over or through the solid material.

The liquid is introduced to the apparatus by means of a passage, generally indicated at 28, extending axially and centrally of the spindle 18 to be discharged from the spindle 18 to the inner periphery of the bowl 8 in the manner and by the means hereinafter more fully explained.

Secured to the spindle 18 in diametrically opposite regions are two helical webs, generally indicated at 29 and 30. These helical webs have respectively secured to their outer edges substantially helically curved blades 31 and 32. On the outer surfaces of the helical blades 31 and 32 are provided a plurality of radially extending blades such as 33. These blades are arranged at a slight pitch so that when the spindle 18 is rotated relatively to the bowl 8, the blades 33 will convey material upwardly across the inner periphery of the bowl 8.

Centrally of the webs 29 and 30 are respectively provided radially extending passages 34 and 35 which at their inner ends communicate with the passage 28 in the spindle 18 and at their outer ends respectively communicate with helical passages 36 and 37 formed in the blades 31 and 32.

The blades 31 and 32 are provided with radially extending openings 38 which are positioned intermediately of the blades 33, such openings being provided in only approximately the lower three fourths of each of the blades 31 and 32. In the openings 38 are fixed spreader members 39 of the form most clearly illustrated in Figure 4, which are provided with vertically arranged slots 40 extending therethrough.

The operation of the apparatus for the purpose of carrying out the processes comprising our invention may be briefly described as follows:—The spindles 9 and 18 and accordingly the bowl 8 and the blades 31 and 32 respectively carried thereby, will be rotated preferably in the same direction but at different speeds by means of the belts 11 and 21.

*Treating solids and liquids*

When it is desired to treat solids with liquids by the previously described apparatus and according to the principles comprising our invention, sufficient solid material of any desired character, such as a filtering medium, will be introduced into the bowl 8 through the opening 27 in the hood 24. The relative movement between the conveyor flights 33 and the inner periphery of the bowl 8 will spread such solid material into a uniform layer over the inner periphery of the bowl 8 to a thickness determined by the clearance between the outer edges of the flights 33 and the inner periphery of the bowl. Completion of this built up wall will be indicated when the solid material being introduced through the opening 27 begins to be discharged into the collecting ring 25.

We will assume that an infusion is to be made by passing a suitable liquid over more or less finely ground material. After the wall on the inner periphery of the drum 8 has been built up in the manner just explained, the material to be infused, or similarly treated by passing a liquid thereover, will be fed into the bowl 8 through the opening 27. The centrifugal force incidental to the high speed rotation of the bowl 8 will throw such material against the inner periphery of the built up wall where it will be mixed and simultaneously intermittently conveyed across the inner periphery of the built up wall. The infusing or treating liquid is then introduced through the passage 28 in the spindle 18 from when it will pass outwardly through the passages 34 and 35 to be ultimately discharged through the slots 40 in the spreader members 39.

The flights 33 not only thoroughly mix and convey the material to be infused or treated upon and over the inner periphery of the previously built up wall but laterally confine such material to be treated at the time the treating liquid is discharged thereinto through the slots 40. After the conveyor and mixing blades 33 pass away from the particular quantity of material which has just been subjected to the treating liquid, the centrifugal force acting on such material will have an opportunity to thoroughly drain the same before the next pair of blades 33 pick up such material, mix, convey and laterally confine the same preparatory to a further injection of the treating liquid.

The discontinuous nature of the flights employed for the purpose of conveying the material across the inner surface of the built up wall assists in effecting a thorough mixing of the material being treated for the reason that between intermittent treatments the material is permitted to drain and flatten down to a certain extent so that when it is again picked up by the conveyor flights a thorough mixing will result.

Providing discharge apertures throughout only a portion of the axial extent of the conveyor permits the material which has been treated by the liquid to be thoroughly dried under centrifugal force before the blades at the upper end of the conveyor finally discharge the same into the collecting ring 25.

It should be noted at this point that liquid material may be treated by solids in exactly the same manner as solids are treated by the liquids as just described. Assuming that a particular liquid is to be treated by a certain solid such as silica gel, the gel will be introduced into the bottom of the bowl 8 where it will be thrown outwardly against the inner periphery of either the foraminous wall of the bowl 8 or on built-up wall thereon to be simultaneously mixed and conveyed over such shell or built-up wall and brought into intimate relation with the liquid which is sprayed therethrough from the orifices 40. The mixing of the gel or similar material simultaneous to its being conveyed through the bowl 8 insures that every particle of such gel or similar material will be brought into contact with the liquid and hence, the treating solid material is utilized to its fullest extent. A process of absorption, whether solid by liquid or liquid by solid, may also be carried out expeditiously in the manner just described.

Treatment by filtration

The process and apparatus comprising our invention is particularly applicable to be used in connection with the filtration of liquids. When the apparatus comprising our invention is to be employed as a filtering means, the following procedure may be adopted; it being understood, of course, that the procedure presently to be described may be varied as to the specific steps enumerated as well as the order of their procedure and further, such process may be carried on with apparatus other than that illustrated for purposes of convenience so long as the fundamental principles of the invention are retained:—

The first step which may be adopted in carrying out the process of filtration is to introduce clean filter material into the empty bowl 7 until a continuous wall of such filter material is built up on the inner periphery of the bowl in the space between the edges of the conveyor flights 33 and the wall of such bowl. After this preliminary wall has been constructed, additional filter material either of the same or a different kind will be introduced to the bowl 8 through the opening 27. Simultaneously with the continued feeding of this additional filter material, the liquid to be filtered will be introduced through the passage 28 in the spindle 18.

The filter material fed to the apparatus in addition to that required to build up the permanent wall will be simultaneously mixed and conveyed across the inner periphery of the drum 8 and while being so mixed and conveyed, the liquid to be filtered will be sprayed therethrough by passing outwardly through the orifices 40. The liquid to be filtered is centrifugally forced into the mixed filtering medium while such medium is laterally confined between adjacent blades 33. After the blades 33 pass away from the filtering material which has just been given a charge of liquid, such freshly charged material will be permitted to drain until next picked up by the succeeding pair of flights, which, in picking up such material, mix, convey and laterally confine the same preparatory to a further charge of liquid.

Providing discharge openings 40 throughout only a portion of the length of the conveyor, permits the filtering material to be thoroughly dried by centrifugal force before it is discharged into the collecting ring 25. The mixing of the filtering material causes every portion of such material to be brought into surface contact with the liquid being filtered, so that the filtering material which is utilized by the apparatus in the process comprising our invention is loaded to its maximum capacity with the residue from the filtrate, so that only a minimum amount of filter material will be used in carrying out such process.

The mixing and conveying of the filtering material across the inner surface of the built up permanent wall between the outer edge of the blades 33 and the inner periphery of the drum 8 as an abrading action on the surface of such wall to prevent the same from becoming clogged, so that the process comprising our invention may be carried on continuously and without interruption in apparatus such as that disclosed.

Filtering or treating by means of ice crystals

It is within the contemplation of our invention to utilize certain materials as a filtering medium which have heretofore never been utilized for this purpose. In filtering liquids containing values relatively unstable at high temperatures, we propose to employ ice crystals as the filtering medium to be introduced to the apparatus through the opening 27 and mixed and conveyed across the inner surface of the drum 8 or the wall built up thereon. When ice crystals are employed as the filtering medium, it may be desirable to build up the permanent wall between the outer edges of the blades 33 and the inner periphery of the drum 8 of some relatively stable filtering medium capable of withstanding the abrading action of the crystals passing thereover and which is also able to afford substantial support for the crystals as the same are forced outwardly due to centrifugal force. Numerous materials other than those mentioned may be employed in carrying out the process comprising our invention and it is to be understood that the principles of this invention are applicable to a wide range of usage which it is believed will be so apparent to those familiar with the art that a further detailed enumeration of such possible usages will not be necessary at this point.

Other modes of applying the principle of our invention may be employed instead of the one explained, change being made as regards the means and the steps herein disclosed, provided those stated by any of the following claims or their equivalent be employed.

We, therefore, particularly point out and distinctly claim as our invention:—

1. The process of treating materials which comprises impounding a quantity of solid material on the inner periphery of a rotating shell, repeatedly momentarily laterally confining and then releasing different portions of such solid material, and centrifugally forcing a fluid into such solid material while the same is momentarily laterally confined.

2. The process of treating materials which comprises impounding a quantity of solid material on the inner periphery of a porous shell, repeatedly momentarily laterally confining and then releasing different portions of such solid material, and forcing a liquid into such solid material while the same is momentarily laterally confined.

3. The process of filtering, which comprises establishing a wall of filter material over the inner periphery of a rotating shell, repeatedly momentarily laterally confining and then releasing different portions of said filter material, and centrifugally forcing a liquid through said filter material while the same is so laterally confined.

4. The process of treating materials, which comprises centrifugally impounding a layer of solid material on the inner periphery of a rotating shell, repeatedly mixing, conveying and laterally confining a quantity of such solid material, and centrifugally forcing a liquid into said solid material while the same is so laterally confined.

5. In material treating apparatus, the combination of a rotatable bowl, a layer of solid material impounded on the inner periphery of said bowl, a conveyor for said solid material comprising a plurality of axially adjacent blades arranged in substantially parallel relation and extending circumferentially only part way around the inner periphery of said bowl, and means for discharging liquid to said solid material at points between axially adjacent blades.

6. In material treating apparatus, the combination of a foraminous rotatable bowl, a layer of solid material impounded on the inner periphery of said bowl, a conveyor for said solid material comprising a plurality of axially adjacent blades arranged in substantially parallel relation and extending circumferentially only part way around the inner periphery of said bowl, and means for discharging liquid to said solid material at points between axially adjacent blades.

7. The process of treating materials which comprises impounding a qauntity of solid material on the inner periphery of a rotating shell, impounding an additional layer of material on said first named layer, repeatedly momentarily laterally confining and then releasing different portions of said last named layer, and forcing a fluid into such material as the same is momentarily laterally confined.

WALTER M. ZORN.
WALTER F. EGGER.